(12) United States Patent
Harari et al.

(10) Patent No.: US 12,422,691 B2
(45) Date of Patent: Sep. 23, 2025

(54) VEHICULAR CAMERA ASSEMBLY WITH LENS BARREL WELDED AT IMAGER HOUSING

(71) Applicant: Magna Electronics Inc., Auburn Hills, MI (US)

(72) Inventors: Janie R. Harari, Boston, MA (US); Rene Dreiocker, Rochester Hills, MI (US); Steven V. Byrne, Goodrich, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 62 days.

(21) Appl. No.: 18/318,251

(22) Filed: May 16, 2023

(65) Prior Publication Data

US 2023/0375849 A1    Nov. 23, 2023

Related U.S. Application Data

(60) Provisional application No. 63/385,824, filed on Dec. 2, 2022, provisional application No. 63/384,237, filed on Nov. 18, 2022, provisional application No. 63/364,832, filed on May 17, 2022.

(51) Int. Cl.
  *G02B 27/62* (2006.01)
  *G03B 17/12* (2021.01)
  *H04N 23/51* (2023.01)
(52) U.S. Cl.
  CPC ............. *G02B 27/62* (2013.01); *G03B 17/12* (2013.01); *H04N 23/51* (2023.01)

(58) Field of Classification Search
  CPC ........ G02B 27/62; G03B 17/12; H04N 23/51; H04N 23/55; H04N 23/57
  USPC ........................................................ 348/148
  See application file for complete search history.

(56) References Cited

U.S. PATENT DOCUMENTS

| 5,412,510 A | 5/1995 | Iizuka et al. |
| 5,550,677 A | 8/1996 | Schofield et al. |
| 5,670,935 A | 9/1997 | Schofield et al. |
| 5,949,331 A | 9/1999 | Schofield et al. |
| 5,978,017 A | 11/1999 | Tino |
| 6,151,065 A | 11/2000 | Steed et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,480,149 B2 | 1/2009 | DeWard et al. |

(Continued)

*Primary Examiner* — Jamie J Atala
*Assistant Examiner* — Mahmoud Kamal Abouzahra
(74) *Attorney, Agent, or Firm* — HONIGMAN LLP

(57) ABSTRACT

A vehicular camera includes a lens barrel accommodating a lens, a housing, and an imager printed circuit board. During assembly of the camera, with the lens barrel received through an alignment element and a first portion of the housing, the lens barrel is adjusted relative to the first portion of the housing and alignment element to initially align the lens relative to the imager. With the lens initially aligned relative to the imager, the alignment element is initially attached to the first portion of the housing and the lens barrel is initially attached to the alignment element to initially retain the lens relative to the imager. With the lens initially retained relative to the imager, the lens barrel is adjusted to further align the lens relative to the imager and the alignment member is secured at the housing and the lens barrel is secured at the alignment member.

30 Claims, 12 Drawing Sheets

(56) References Cited

U.S. PATENT DOCUMENTS

| | | |
|---|---|---|
| 7,595,943 B2 | 9/2009 | Yuan |
| 7,720,580 B2 | 5/2010 | Higgins-Luthman |
| 7,855,755 B2 | 12/2010 | Weller et al. |
| 7,965,336 B2 | 6/2011 | Bingle et al. |
| 8,256,821 B2 | 9/2012 | Lawlor et al. |
| 8,542,451 B2 | 9/2013 | Lu et al. |
| 8,994,878 B2 | 3/2015 | Byrne et al. |
| 9,077,098 B2 | 7/2015 | Latunski |
| 9,233,641 B2 | 1/2016 | Sesti et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,621,769 B2 | 4/2017 | Mai et al. |
| 9,871,971 B2 | 1/2018 | Wang et al. |
| 9,896,039 B2 | 2/2018 | Achenbach et al. |
| 10,142,532 B2 | 11/2018 | Mleczko |
| 10,207,646 B2 | 2/2019 | Oh |
| 10,230,875 B2 | 3/2019 | Mleczko et al. |
| 10,250,004 B2 | 4/2019 | Conger et al. |
| 10,264,219 B2 | 4/2019 | Mleczko et al. |
| 10,272,857 B2 | 4/2019 | Conger et al. |
| 10,274,812 B1 | 4/2019 | Chen |
| 10,676,041 B2 | 6/2020 | Sesti et al. |
| 11,199,758 B2 | 12/2021 | Sesti et al. |
| 11,579,400 B2 | 2/2023 | Reckker et al. |
| 2001/0055073 A1 | 12/2001 | Shinomiya |
| 2003/0090569 A1 | 5/2003 | Poechmueller |
| 2003/0128291 A1 | 7/2003 | Harazono et al. |
| 2004/0069998 A1 | 4/2004 | Harazono |
| 2005/0219717 A1* | 10/2005 | Uehira .............. B29C 66/545 359/793 |
| 2005/0238281 A1* | 10/2005 | Epitaux .............. G02B 26/0875 385/16 |
| 2007/0058964 A1* | 3/2007 | Shangguan .............. G03B 3/02 396/144 |
| 2007/0077051 A1* | 4/2007 | Toor .............. H04N 23/55 396/144 |
| 2007/0146908 A1 | 6/2007 | Li |
| 2007/0200053 A1 | 8/2007 | Nomura et al. |
| 2009/0103193 A1* | 4/2009 | Berube .............. G02B 7/025 359/819 |
| 2009/0244361 A1 | 10/2009 | Gebauer et al. |
| 2011/0025850 A1 | 2/2011 | Maekawa et al. |
| 2011/0279675 A1 | 11/2011 | Mano et al. |
| 2011/0298925 A1 | 12/2011 | Inoue et al. |
| 2012/0019940 A1 | 1/2012 | Lu et al. |
| 2013/0130937 A1 | 5/2013 | Sun et al. |
| 2013/0183499 A1 | 7/2013 | Kido et al. |
| 2013/0242099 A1 | 9/2013 | Sauer et al. |
| 2014/0298642 A1 | 10/2014 | Sesti et al. |
| 2014/0313337 A1 | 10/2014 | Devota et al. |
| 2014/0373345 A1 | 12/2014 | Steigerwald |
| 2015/0015713 A1 | 1/2015 | Wang et al. |
| 2015/0029337 A1 | 1/2015 | Uchiyama et al. |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2015/0379361 A1 | 12/2015 | Boulanger |
| 2016/0037028 A1 | 2/2016 | Biemer |
| 2016/0191863 A1 | 6/2016 | Minikey, Jr. et al. |
| 2016/0243987 A1 | 8/2016 | Kendall |
| 2016/0268716 A1 | 9/2016 | Conger et al. |
| 2016/0284752 A1 | 9/2016 | Shi |
| 2016/0286103 A1 | 9/2016 | Van Dan Elzen |
| 2017/0036600 A1 | 2/2017 | Whitehead et al. |
| 2017/0054881 A1 | 2/2017 | Conger et al. |
| 2017/0126938 A1 | 5/2017 | Newiger |
| 2017/0129419 A1 | 5/2017 | Conger et al. |
| 2017/0133811 A1 | 5/2017 | Conger et al. |
| 2017/0201661 A1 | 7/2017 | Conger |
| 2017/0280034 A1 | 9/2017 | Hess et al. |
| 2017/0295306 A1 | 10/2017 | Mleczko |
| 2017/0302829 A1 | 10/2017 | Mleczko et al. |
| 2018/0027151 A1 | 1/2018 | Kazama et al. |
| 2018/0033741 A1 | 2/2018 | Dubey et al. |
| 2018/0042106 A1 | 2/2018 | Scheja |
| 2018/0072239 A1 | 3/2018 | Wienecke et al. |
| 2018/0098033 A1 | 4/2018 | Mleczko et al. |
| 2018/0364441 A1 | 12/2018 | Hubert et al. |
| 2019/0052782 A1* | 2/2019 | Sung .............. G03B 17/12 |
| 2019/0121051 A1 | 4/2019 | Byrne et al. |
| 2019/0124238 A1 | 4/2019 | Byrne et al. |
| 2019/0124243 A1 | 4/2019 | Mleczko et al. |
| 2019/0129281 A1 | 5/2019 | Chen |
| 2019/0137724 A1 | 5/2019 | Kim et al. |
| 2019/0166289 A1 | 5/2019 | Knutsson et al. |
| 2019/0306966 A1 | 10/2019 | Byrne et al. |
| 2019/0326725 A1 | 10/2019 | Nagatomo et al. |
| 2019/0355606 A1 | 11/2019 | Flotgen |
| 2020/0001787 A1 | 1/2020 | Lu et al. |
| 2020/0010024 A1 | 1/2020 | Sesti et al. |
| 2020/0033549 A1 | 1/2020 | Liu et al. |
| 2020/0070453 A1 | 3/2020 | Piotrowski et al. |
| 2020/0137926 A1 | 4/2020 | Wohlte |
| 2020/0154020 A1 | 5/2020 | Byrne et al. |
| 2020/0172019 A1 | 6/2020 | Ding et al. |
| 2020/0204711 A1 | 6/2020 | Guidi et al. |
| 2020/0333619 A1 | 10/2020 | Ang et al. |
| 2020/0409016 A1 | 12/2020 | Jiang et al. |
| 2020/0412925 A1 | 12/2020 | Byrne et al. |
| 2021/0382375 A1 | 12/2021 | Sesti et al. |
| 2022/0103723 A1 | 3/2022 | Skrocki et al. |
| 2024/0040217 A1* | 2/2024 | Nakamura .............. H04N 23/54 |

* cited by examiner

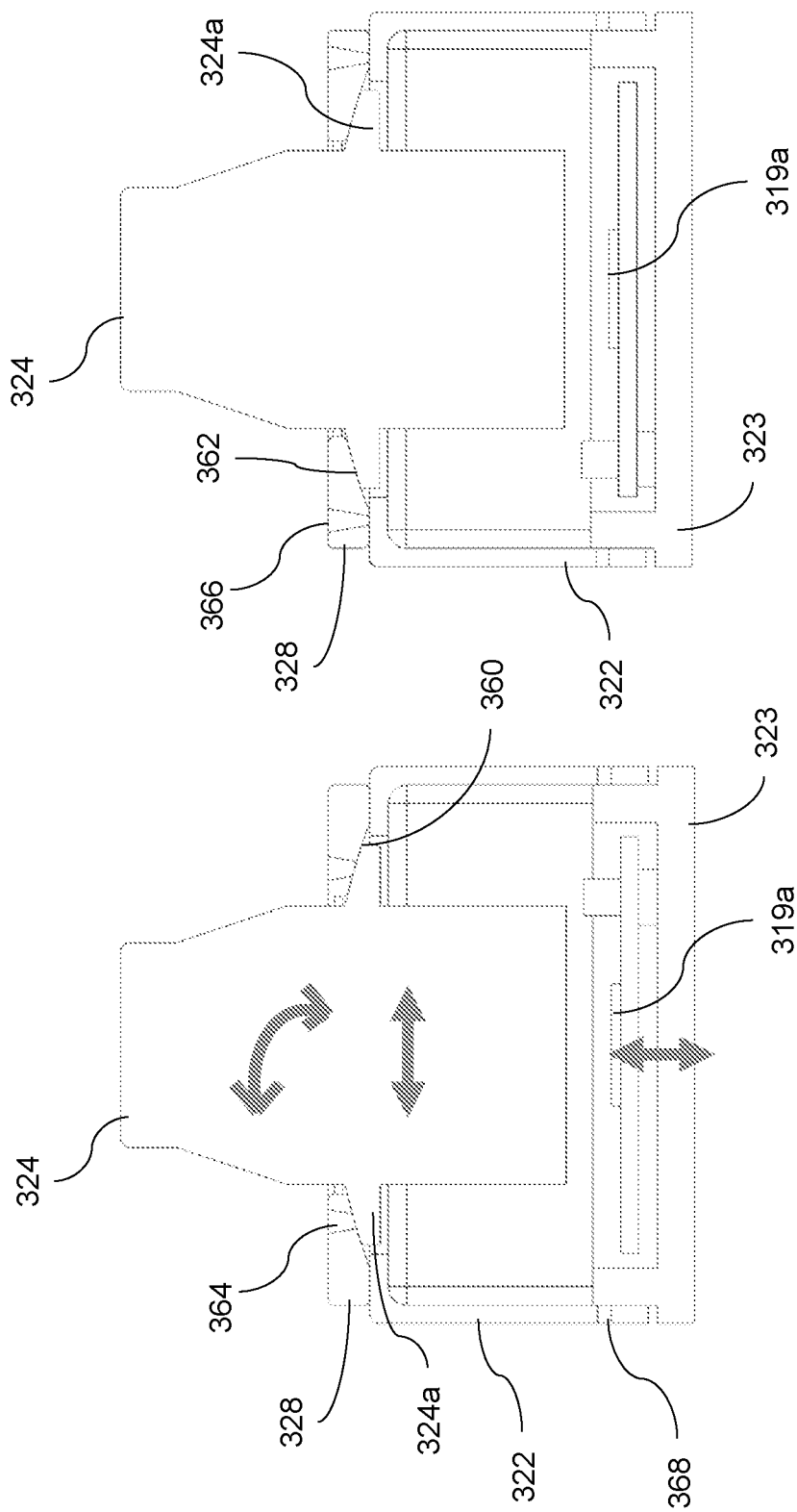

VEHICULAR CAMERA ASSEMBLY WITH LENS BARREL WELDED AT IMAGER HOUSING

CROSS REFERENCE TO RELATED APPLICATIONS

The present application claims the filing benefits of U.S. provisional application Ser. No. 63/385,824, filed Dec. 2, 2022, U.S. provisional application Ser. No. 63/384,237, filed Nov. 18, 2022, and U.S. provisional application Ser. No. 63/364,832, filed May 17, 2022, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 7,965,336; 5,949,331; 5,670,935 and/or 5,550,677, which are hereby incorporated herein by reference in their entireties.

SUMMARY OF THE INVENTION

A vehicular camera is configured to be disposed at a vehicle so as to have a field of view exterior (or interior) of the vehicle. The camera includes a lens barrel that accommodates a lens and has an inner end. A camera housing includes a first portion and a second portion joined with the first portion. The first portion of the camera housing includes a passageway formed therethrough. An imager printed circuit board (imager PCB) includes a first side and a second side opposite the first side and separated from the first side by a thickness of the imager PCB. An imager is disposed at the first side of the imager PCB. The imager PCB is accommodated within a cavity of the camera housing (formed when the second portion is joined with the first portion) with the imager facing the passageway of the first portion of the camera housing. An alignment member is adjustably disposed at the first portion of the camera housing and circumscribes the passageway. The inner end of the lens barrel is adjustably received through the alignment member and adjustably received at the first portion of the camera housing with the lens aligned with the imager. With the lens barrel adjustably received at the first portion of the camera housing, the lens barrel is adjusted relative to the first portion of the camera housing and the alignment member to at least partially align the lens relative to the imager. With the lens at least partially aligned relative to the imager, the alignment member is at least partially secured (such as tack welded) to the first portion of the camera housing and the lens barrel is at least partially secured (such as tack welded) to the alignment member to at least partially or initially secure the lens barrel relative to the imager. With the lens at least partially aligned relative to the imager and with the lens barrel at least partially secured relative to the imager, the lens barrel may be further adjusted relative to the first portion of the camera housing and the alignment member to further align and focus the lens relative to the imager. With the lens further or finally aligned and focused relative to the imager, the alignment member is further or finally secured (such as laser welded) to the first portion of the camera housing and the lens barrel is further or finally secured (such as laser welded) to the alignment member to further or finally secure the lens barrel relative to the imager.

These and other objects, advantages, purposes and features of the present invention will become apparent upon review of the following specification in conjunction with the drawings.

BRIEF DESCRIPTION OF THE DRAWINGS

FIGS. 10 and 11 are sectional views of the camera assembly of FIG. 8;

DESCRIPTION OF THE PREFERRED EMBODIMENTS

A vehicle vision system and/or driving assist system and/or object detection system and/or alert system operates to capture images exterior of the vehicle and may process the captured image data to detect objects at or near the vehicle and in the predicted path of the vehicle. For example, a forward viewing camera disposed at and behind the windshield of the vehicle may capture image data of the scene forward of the vehicle for one or more driving assist systems of the vehicle. Optionally, one or more other cameras may be disposed at the vehicle with exterior fields of view, whereby the image data captured by those cameras may be processed for object detection and/or used to generate video images for viewing by the driver of the vehicle, such as to assist a driver of the vehicle in maneuvering the vehicle in a rearward direction. The vision system includes an image processor or image processing system that is operable to receive image data from one or more cameras and provide an output to a vehicle system and/or to a display device for displaying images representative of the captured image data. Optionally, the vision system may provide display, such as a rearview display or a top down or bird's eye or surround view display or the like.

Figure 1:
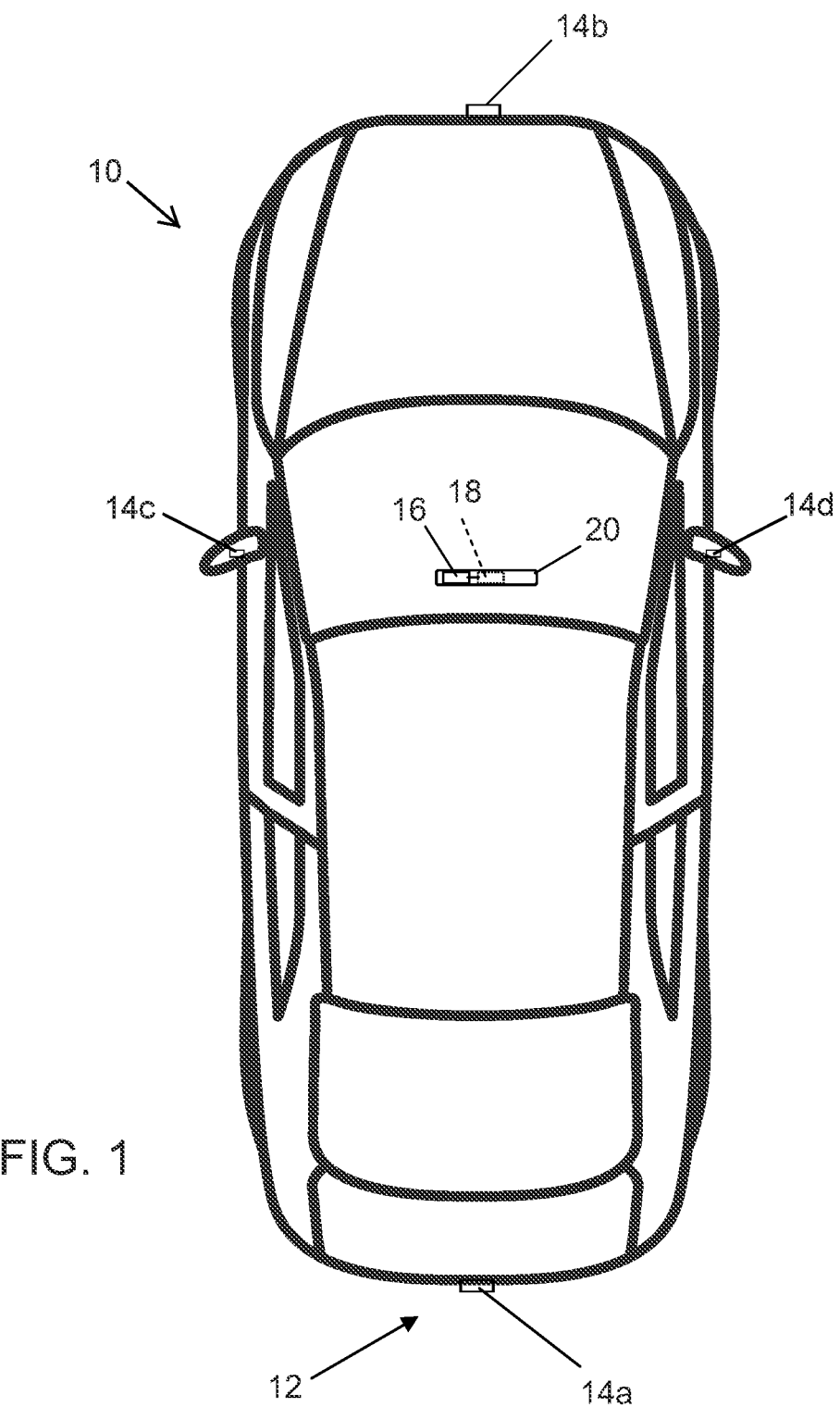
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Typically, active focus and alignment is used to set and secure a focal position of a lens to an imager component for a vehicular camera. However, this leads to expensive and complicated measures to manage the compliance tolerances created by camera components and manufacturing focus/alignment process. For example, a camera may be assembled using an active PCB alignment, which may use screws to secure the PCB to the lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the housing using screws and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the housing or lens holder utilizing adhesive initially, and then the imager PCB is actively moved relative to the housing or lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV and additional curing. This curing increases the tolerance stack of the finished assembly.

Vehicular camera lenses need to be positioned relative to an imager with micron-level (such as 0.5 micrometers or less) tolerances in 5 or 6 degrees of freedom. Typically, this is done with UV cured glue. This glue is expensive in terms of both material cost (e.g., about $0.25 per unit or more) and cycle time (e.g., about 6 to 8 seconds for UV curing). Additionally, the dimensional stability of the glue is sensitive to humidity and temperature changes according to the coefficient of thermal expansion (CTE) of the UV glue.

Securing the lens assembly to the imager housing using a weld joint is beneficial in that it can eliminate or reduce the sensitivity of UV curing to environments, providing increased stability with environmental changes. The cycle time can also be significantly reduced. However, securing the lens assembly to the imager housing assembly using a weld joint poses its own set of issues. For example, movement during the welding process—such as caused by shrinkage of the molten metal as cooling occurs, alloy compatibility between the welding material and the lens holder or lens barrel, and closing the gap between the lens barrel and the imager housing. This gap is critical to position the lens with respect to the imager.

Referring now to FIGS. 2-6B, a build assembly process for assembling a vehicular camera 14 includes positioning the lens barrel 24 at the front housing portion 22 of the camera housing and at least partially aligning the lens 26 and the imager. With the lens 26 of the lens barrel 24 at least partially aligned (and optionally at least partially focused) with the imager, an alignment member 28 (such as a lens bezel or filler material or wedge) is at least partially affixed (such as via tack welding) to the lens barrel 24 and the front housing portion 22 of the camera to at least partially secure the lens barrel 24 relative to the front housing portion 22 and the imager. Then, with the lens 26 at least partially aligned with the imager and the lens barrel 24 at least partially secured to the front housing portion 22 of the camera, the lens barrel 24 may be further adjusted relative to the front housing portion 22 and the alignment member 28 to further align and focus the lens 26 relative to the imager, and then the alignment member 28 is further affixed (such as via laser welding) to the front housing portion 22 of the camera and the lens barrel 24 to further secure the lens barrel 24 to the front housing portion 22. As described below, initially securing (such as via tack welding) the lens barrel 24 relative to the front housing portion 22 of the camera via the alignment member 28 (e.g., lens bezel, filler material, wedge filler or the like), further adjusting (after tack welding) the lens barrel 24 relative to the imager, and further securing (such as via welding) the lens barrel 24 relative to the front camera housing 22 via the alignment member 28 provides such advantages as compensating for movement during the welding process, ensuring alloy compatibility, and ensuring the gap between the lens barrel and front housing portion is suitable for full adjustment of the lens relative to the imager. Welding may refer to weld joints, braze joints, and/or solder joints (including tacks).

The vehicular camera or imager assembly 14 includes an imager printed circuit board (imager PCB) having an imager disposed at a first side of the imager PCB. The imager PCB is received in or attached at a camera housing 22 and the camera housing may include a first or front camera housing portion and a second or rear camera housing portion. The camera housing portions may be joined together in any suitable manner, such as via laser welding. The imager PCB is disposed within or between the front and rear camera housing portions with the imager facing a passageway or aperture formed through the front camera housing portion 22. A lens barrel 24 accommodating a lens 26 including a plurality of lens optics or optic elements is adjustably received at an outer surface of the front camera housing portion 22 (and optionally within the passageway of the front camera housing portion), so that the lens 26 aligns with the imager of the imager PCB. An alignment member 28 (such as, for example, a lens bezel) is adjustably disposed at the outer surface of the camera housing 22 and circumscribes the passageway through the front housing portion so that the lens barrel 24 is received in an aperture or passageway of the bezel 28 and the passageway of the camera housing 22. A gap between the lens bezel 28 and the lens barrel 24 allows for adjustment of the lens barrel 24 relative to the camera housing, lens bezel, and imager PCB (such as along 5 or 6 degrees of freedom).

With the lens barrel 24 adjustably received at the camera housing 22, the lens barrel 24 is initially adjusted relative to the camera housing 22, the alignment member 28, and the imager PCB to at least partially align the lens 26 and the imager. While the lens barrel 24 is adjusted, movement of the lens barrel 24 may cause the lens bezel or alignment member 28 to move along the outer surface of the camera housing 22. With the lens 26 at least partially aligned with the imager, the lens barrel 24 is at least partially secured to the alignment member 28 and the alignment member 28 is at least partially secured to the camera housing 22 to at least partially secure the lens relative to the imager. For example, a three-way fiber laser with three laser heads can be used to secure or retain the initial position of the lens barrel and imager housing.

Movement of the lens barrel relative to the camera housing may occur during or after the initial welding phase. Specifically, welding across gaps exacerbates movement and shrinkage as additional metal or soldering material must be melted. Welding T-joints and L-joints poses similar issues as the cooling metal or soldering material distorts the joint angularity. Thus, the lens barrel may be further adjusted relative to the camera housing 22 and the alignment member 28 to further align or actively focus the lens 26 relative to the imager. That is, after the initial set of welds, readjustment, such as via laser welding or post-weld processing (e.g., laser hammering) techniques, can be used to correct post-weld shift and to reposition the components. For example, the post-weld processing may include laser hammering, whereby a brief but intense pulse of laser radiation is applied at the components.

After the lens barrel is further adjusted, the alignment member 28 is further secured (such as via laser welding) to the lens barrel 24 and the camera housing 22 to further secure the lens barrel relative to the imager.

Figure 2:
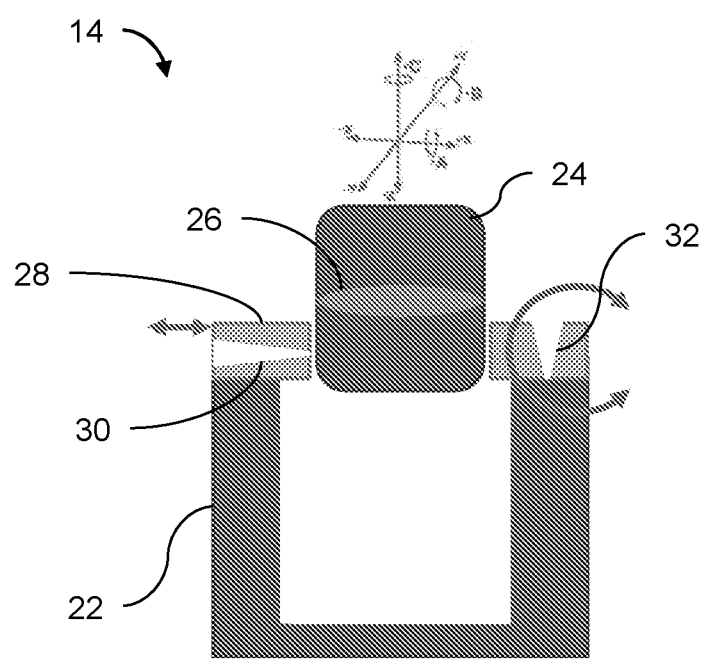
FIG. 2 is a sectional view of a camera assembly including an alignment member adjustably receiving a lens barrel at the camera housing.

The lens bezel or attachment member 28 may include a horizontal or radial through hole 30 (one shown in FIG. 2, but the attachment member may have two or three or four (or more) such through holes) formed perpendicular to an axis of the passageway of the bezel. That is, the perpendicular or radial through hole 30 may pass through the bezel perpendicular to the passageway through which the lens barrel 24 is accommodated. Thus, the perpendicular through hole 30 allows for tack welding the bezel 28 to the lens barrel 24 to secure the lens barrel relative to the bezel 28. Optionally, the through hole 30 may extend through the bezel (i.e., from an outer side wall of the bezel to an inner side wall of the bezel) at an oblique angle relative to the axis of the passageway of the bezel.

The bezel or attachment member may also include a vertical or parallel or axial through hole 32 (one shown in FIG. 2, but the attachment member may have two or three or four (or more) such through holes) formed parallel to the axis of the passageway through which the lens barrel 24 is accommodated so that the bezel 28 may be tack welded to the camera housing 22 at the parallel through hole 32. Optionally, the through hole 32 may extend through the bezel (i.e., from an upper or outer surface of the bezel to a lower or inner surface of the bezel) at an oblique angle relative to the axis of the passageway of the bezel.

Figure 3A:
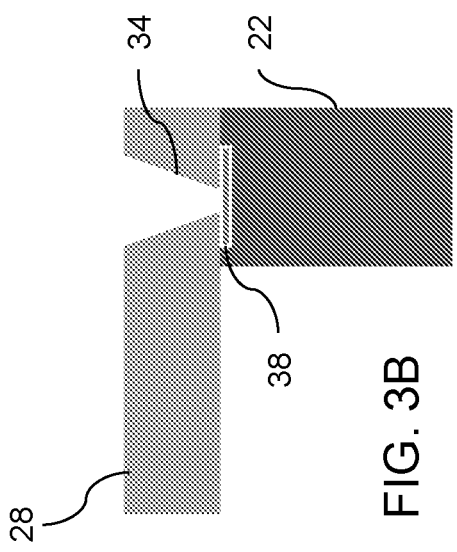
FIGS. 3A-3D are sectional views of an alignment member having an aperture formed through the alignment member with various filler elements disposed at the aperture for tack welding the alignment member to the camera housing.

As shown in FIGS. 3A-3D, the through hole 32 (one shown in each of FIGS. 3A-3D, but the attachment member may have two or three or four (or more) such through holes) and tack welding or joining component may comprise any suitable construction. For example, FIG. 3A depicts a countersunk or conical through hole 34 with a collapsible or deformable or meltable solder post 36 disposed at the camera housing 22 and within the conical through hole 34. The cylindrical solder post 36 extends along the conical through hole 34 and the conical through hole 34 tapers outward from the end facing the camera housing 22. When the bezel 28 is tack welded to the camera housing 22, the solder post 36 melts or deforms to conform to the conical through hole 34, thus at least partially securing the bezel 28 to the camera housing 22.

Figure 3B:
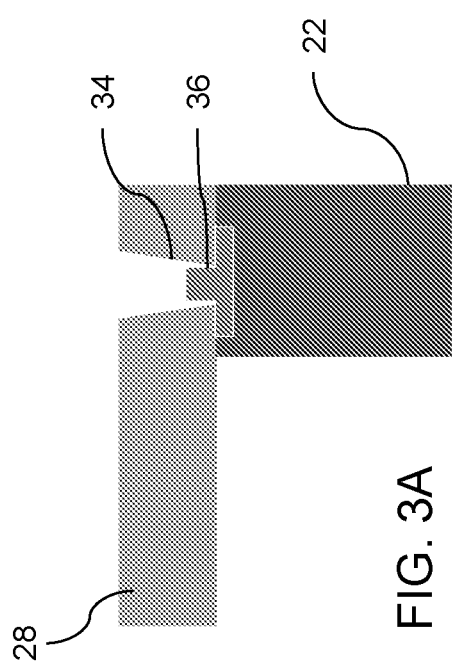
Figure 3C:
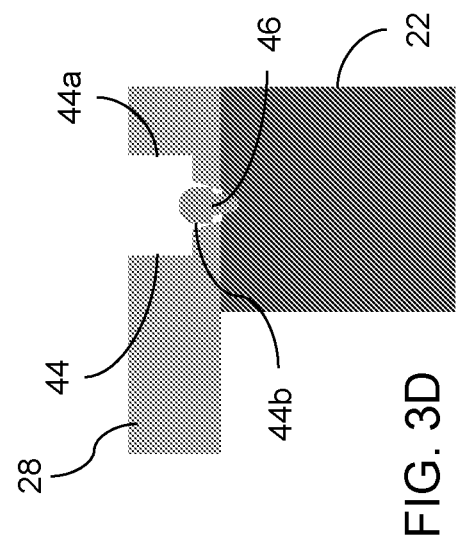
Figure 3D:
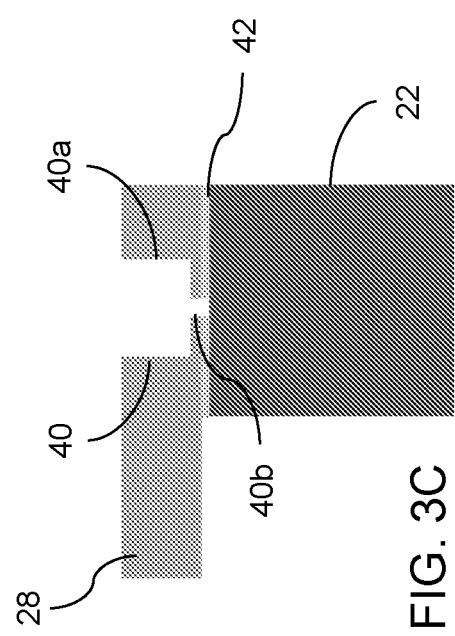

In FIG. 3B, the countersunk or conical through hole 34 is positioned at a solder or weld bushing 38 that may be tack welded to the bezel 28 and camera housing 22 or that may receive a solder material to tack weld the bezel 28 to the camera housing 22 within the conical through hole 34. In FIG. 3C, a counter-bored or non-tapered through hole 40 extends through the bezel 28 and is positioned at the camera housing 22 with a cladding 42 disposed between the bezel 28 and the camera housing 22. The cladding 42 may be disposed on both the bezel 28 and the camera housing 22 and may be used for a braze joint. The counter-bored through hole 40 may include a first portion 40a having a larger diameter and a second portion 40b closer to the camera housing 22 having a smaller diameter. In FIG. 3D, a through hole 44 may have a counter-bored portion 44a and a counter-sunk portion 44b where the counter-sunk portion 44b has a smaller diameter than the counter-bored portion 44a and is disposed closer to the camera housing 22. A weld plug 46 is disposed in the through hole 44 and may be a separate consumable or a part of the camera housing 22. That is, the weld plug 46 may comprise part of the camera housing 22 and the through hole 44 may be positioned at the weld plug 46 when the bezel 28 is positioned at the camera housing 22. The weld plug 46, when the bezel 28 is tack welded to the camera housing 22, may melt or deform to conform to or at least partially fill the through hole 44 and at least partially secure the bezel 28 to the camera housing 22.

Thus, to accommodate the gap between surfaces, ensure the compatibility of the base metals, and provide the smooth mating surface that is necessary for micron-level tolerances in alignment between the lens and imager, a polished bezel can be used to connect the lens barrel to the imager housing. The bezel may reduce or eliminate the gap between the lens barrel and the imager housing in the Z direction. This polished bezel may be tack welded to the lens barrel in three places and to the imager housing in three places, for a total of six tack welds. To accommodate a smaller spot size, specific counter-bored/counter-sunk geometry may be used.

Figure 4:
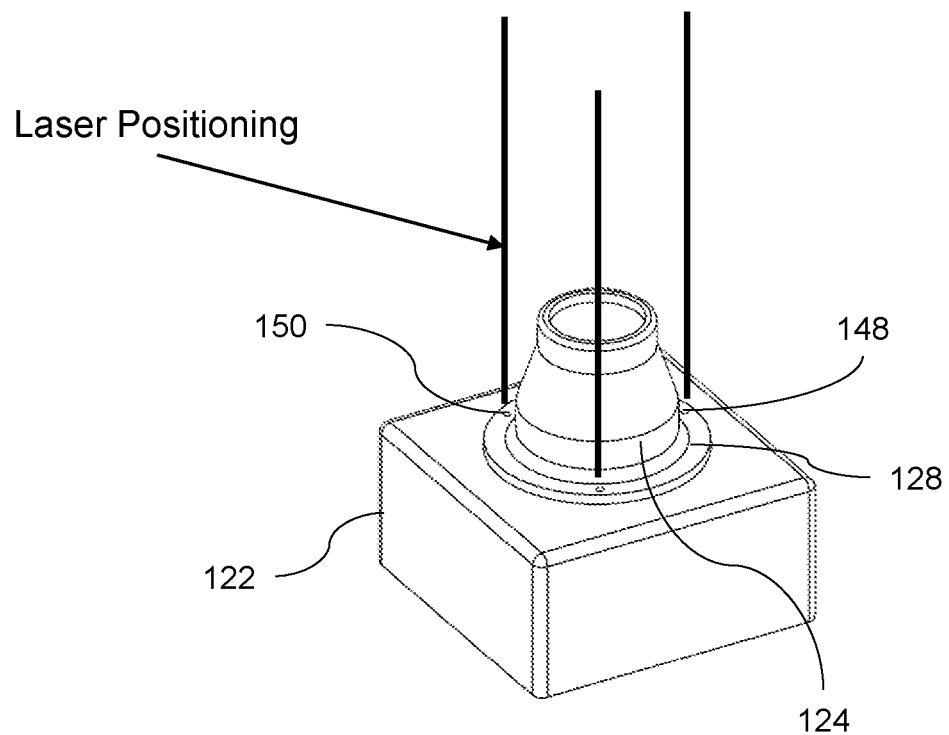
FIG. 4 is a perspective view of a lens barrel disposed at a camera housing with lasers tack welding the lens barrel to the camera housing.

Optionally, and such as shown in FIGS. 4 and 5A-5C, the lens barrel 124 may include a bezel or flange 128 (fixedly attached at the lens barrel or formed as part of the lens barrel) that circumscribes the lens barrel 124 and that engages an outer surface of the camera housing 122. Thus, the lens barrel 124 may be disposed at the outer surface of the camera housing 122 or the lens barrel may extend beyond the flange 128 and be at least partially received in the passageway of the camera housing 122. The bezel 128 may include through holes 148 disposed therethrough, such as three or more through holes, with respective filler material or filler elements 150 disposed in each through hole. When the lens barrel is disposed at the camera housing, the filler elements 150 may be disposed within the through holes or apertures 148 of the bezel 128 and disposed between the bezel or lens barrel and the outer surface of the camera housing 122. During the tack welding phase, the filler element 150 is used to tack weld the lens barrel and bezel to the camera housing 122. In FIG. 4, the apertures 148 in the bezel are formed parallel to the lens axis (i.e., in a Z direction). Thus, the laser welding techniques used to tack weld and fully secure the lens barrel and bezel relative to the camera housing may originate in the Z direction. Additionally, the filler elements 150 may deform in the Z direction and thus, the laser hammering techniques may also adjust the lens barrel relative to the camera housing in the Z direction.

Figure 5C:
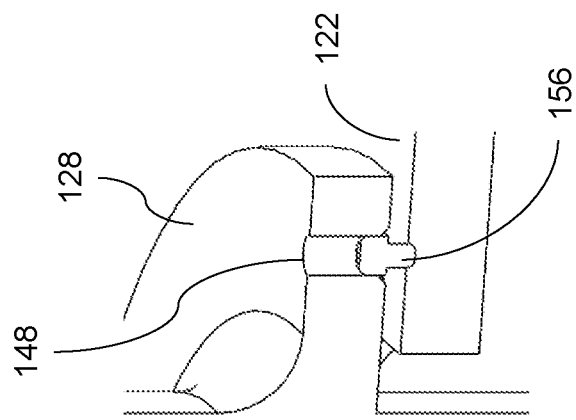
FIGS. 5A-5C are sectional views of an aperture formed through a bezel of the lens barrel of FIG. 4 with various filler elements disposed at the aperture for tack welding the lens barrel to the camera housing.
Figure 5B:
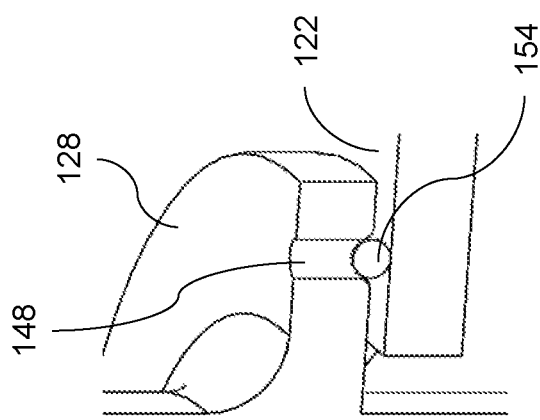
Figure 5A:
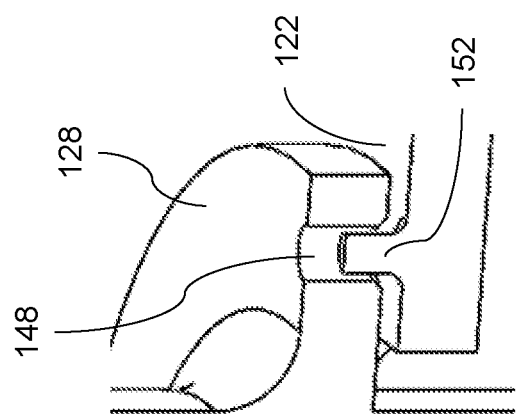

As shown in FIG. 5A, the filler element 150 may comprise a built-in or integral filler element 152 that is built into or integral with the camera housing (e.g., a post protruding from the surface of the camera housing at which the bezel of the lens barrel interfaces). The built-in filler element 152 may be part of the base metal and built into the housing 122. Thus, when the lens barrel 124 is positioned at the camera housing 122, the built-in filler element 150 is received in and disposed at the aperture 148 and the lens barrel 124 is ready to be tack welded into place. The built-in filler element 152 may comprise a material having a lower melting point than the camera housing 122 so that the built-in filler element may be deformed or melted without deforming or melting the camera housing 122. FIG. 5B includes a solder sphere 154 filler element that may be disposed at the aperture 148 before or after the lens barrel is positioned at the camera housing. Similarly, FIG. 5C includes a weld post or consumable welding element 156 disposed at the aperture 148. The solder sphere 154 and weld post 156 may be disposed between the bezel 128 and the camera housing 122 and deform or melt responsive to being tack welded to at least partially fill the aperture and at least partially secure the lens barrel 124 relative to the camera housing 122. The solder sphere 154 and weld post 156 may be at least partially received in divots or recesses formed along the outer surface of the camera housing 122 to position the solder material prior to tack welding.

That is, as an alternative to the separate polished bezel that is tack welded to the lens barrel during the focus and alignment process, the bezel or flange may be part of the lens barrel and, to accommodate the gap between the lower and upper housing (or the lens barrel and the camera housing), "filler metal" can be (i) built into one of the housings (or the lens barrel), or (ii) added as a separate feature (e.g., a weld consumable, a solder sphere, and the like) and used in conjunction with a plug weld joint design. The laser used to join the parts may originate in the Z direction. By locating the laser in this position, the laser hammering techniques used will also be directed in the Z direction, where the tightest tolerances are needed.

Figure 6A:
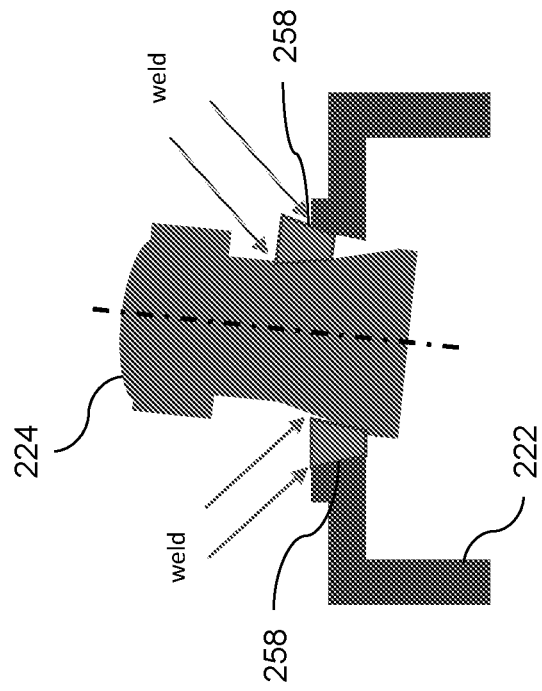
FIGS. 6A and 6B are sectional views of a conical lens barrel disposed through a passageway of the camera housing and having wedge-shaped alignment members disposed at least partially along the passageway to accommodate adjustment of the lens barrel within the passageway.
Figure 6B:
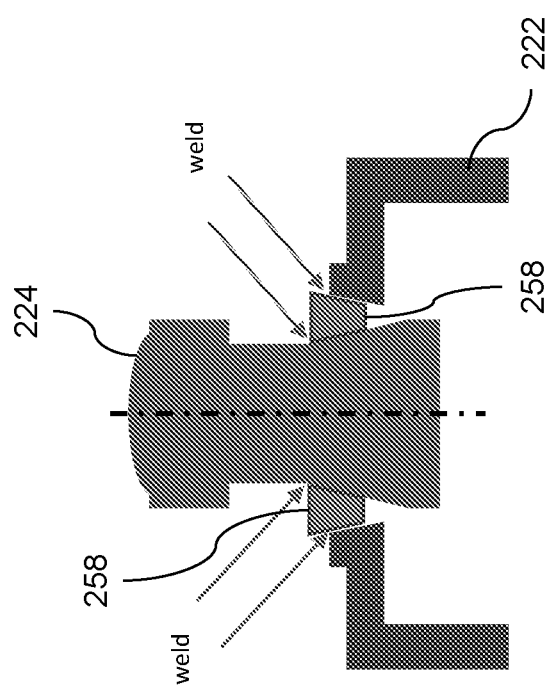

Optionally, and such as shown in FIGS. 6A and 6B, the alignment member may include one or more (e.g., two or three or four or more) wedge elements 258 disposed within the passageway of the camera housing 222 and between the lens barrel 224 and the passageway of the camera housing. That is, the lens barrel 224 may be at least partially received in the passageway of the camera housing 222 and the one or more wedge elements 258 circumscribe the lens barrel 224 and are at least partially wedged between the outer surface of the lens barrel and walls of the passageway of the camera housing 222. The passageway may comprise a tapered or conical passageway so that the wedge shaped wedge elements 258 are precluded from falling through the passageway when the lens barrel is adjusted. As shown in FIGS. 6A and 6B, as the lens barrel 224 is adjusted relative to the camera housing 222, the wedge elements 258 are pushed out of or move into the passageway to accommodate movement of the lens barrel 224. For example, if the lens barrel 224 is tilted relative to the camera housing 222 in a first direction (e.g., right in FIG. 6B), the wedge element 258 at the corresponding side of the lens barrel 224 (e.g., right in FIG. 6B) may at least partially rise out of the passageway where the wedge element 258 at the opposite side of the lens barrel 224 (e.g., left in FIG. 6B) may fall or move into the passageway. That is, the wedge elements move along the passageway between the outer surface of the lens barrel and the camera housing 222 according to movement of the lens barrel relative to the camera housing within the passageway. For example, three or four tapered wedges can be used to accommodate the gap between the lens barrel and the imager housing. These wedges may be tacked in two places each (to the lens barrel and to the camera housing), for a total of six or eight tack welds that initially hold the lens barrel relative to the imager. The wedge elements 258 may be utilized with a conical lens barrel 224 or any suitable construction lens barrel. After the wedge elements are tack welded to the lens barrel and the camera housing, the post-weld processing (e.g., laser hammering) may be used to further focus and align the lens relative to the imager, after which the wedge elements may be fully welded (e.g., laser welded) to the lens barrel and the imager to fully secure the lens barrel and lens relative to the camera housing and imager. Optionally, spherical elements may be used instead of wedge shaped elements. Optionally, a continuous ring with a wedge or spherical or otherwise tapered cross-section may be disposed between the lens barrel 224 and the aperture of the camera housing 222. The continuous ring may be flexible to accommodate movement of lens barrel 224 so that one side or portion of the ring may rise along the passageway while an opposite side or portion of the ring falls or moves along the passageway to accommodate the movement of the lens barrel 224 within the passageway (e.g., FIG. 6B).

Figure 7B:
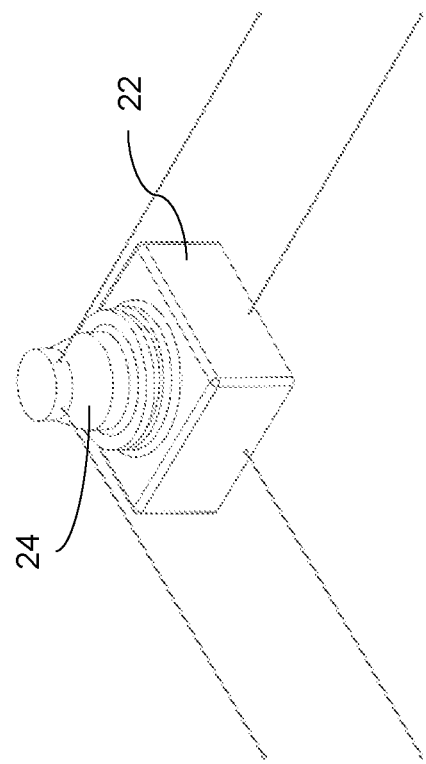
FIGS. 7A and 7B are perspective views of the camera assembly being measured using a laser measurement system.
Figure 7A:
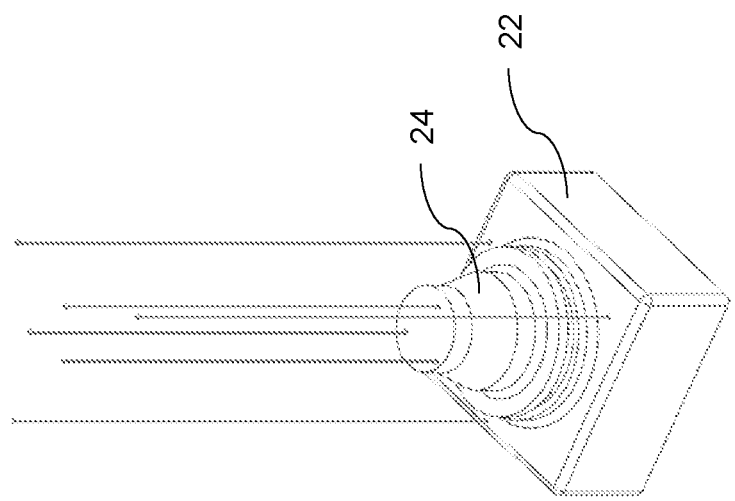
Figure 9:
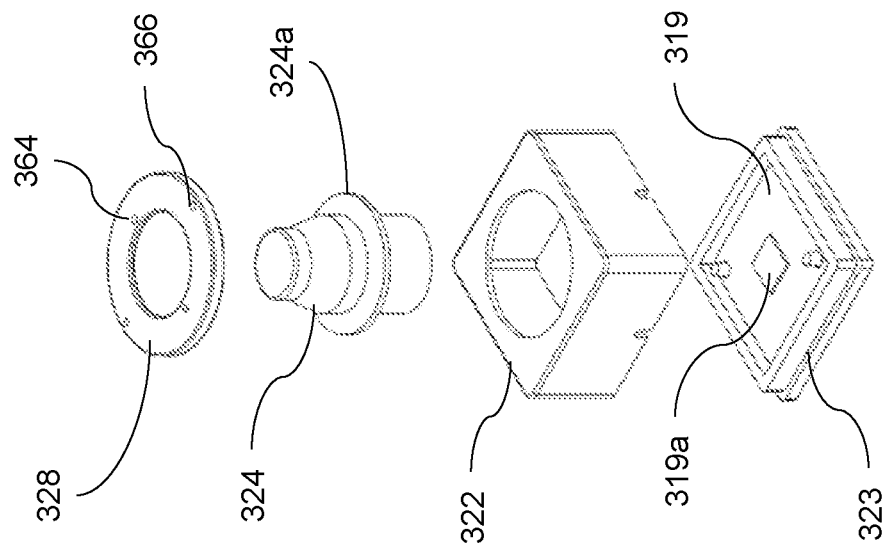
FIG. 9 is an exploded view of the camera assembly of FIG. 8.
Figure 8:
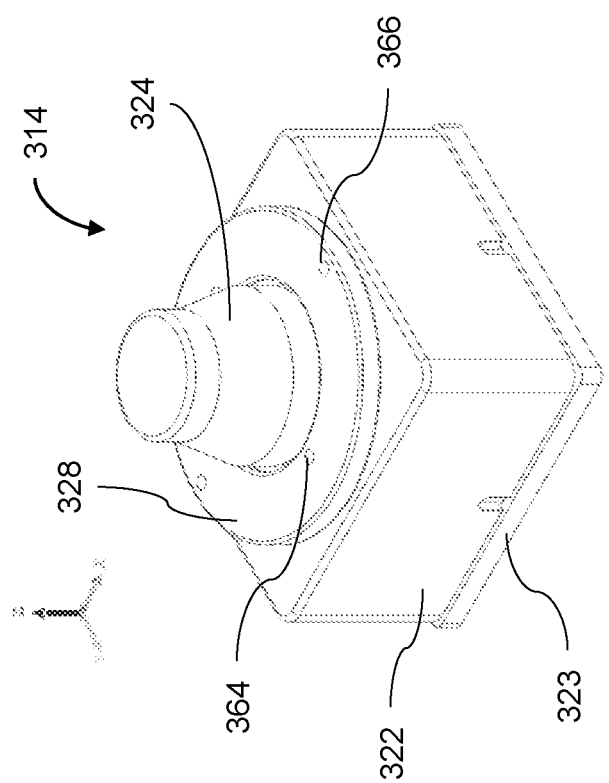
FIG. 8 is a perspective view of another camera assembly with an alignment washer disposed at an outer surface of the front camera housing.

As shown in FIGS. 7A and 7B, a measurement system may be utilized to measure the lens barrel and housing movement during and after the welding process, such as within an accuracy of 0.5 micrometers or less. For example, six lasers may be used to measure positioning along the Z plane for both the camera housing 22 and the lens barrel 24, with three lasers measuring the camera housing 22 and three lasers measuring the lens barrel 24 (FIG. 7A). Four lasers may be used to measure the X and Y positioning of the camera housing 22 and lens barrel 24 (FIG. 7B). The measurement system may include one or more CL 3000 lasers or positioners from Keyence, a manual micro positioner, mounting hardware, clamping hardware, data acquisition (ACQ) modules, controllers/amplifiers, 1:3 splitter module, aluminum assemblies for trials, clad and solder materials, base mechanics/racking. The measurement system may provide results for position stability, weld quality, weld strength, post bond testing (position, debris, bond quality, etc.), with measurement results for yaw, pitch, and Z position for both the camera housing and lens barrel.

Referring now to FIGS. 8-14, a camera assembly 314 includes an imager PCB 319 having an imager 319*a* received in or attached at a rear housing or housing portion 323 of the camera housing. A front housing or housing portion 322 is joined to the rear housing 323, such as via laser welding, and the imager 319*a* at the rear surface of the rear housing 323 faces an aperture or passageway formed through the front housing 322. The lens barrel 324 accommodating a lens is received along the passageway of the front housing 322 so that the lens aligns with the imager 319*a*. The lens barrel 324 includes an annular flange 324*a* extending along an outer surface of the lens barrel 324 at a position between the inner end and outer end of the lens barrel 324 and along a plane that is perpendicular to the longitudinal axis of the lens barrel 324. Optionally, the flange 324*a* may be tapered such that a thickness of the flange 324*a* at or near the lens barrel 324 is greater than a thickness of the flange 324 at an end of the flange 324*a* distal from the lens barrel 324 (e.g., FIG. 10).

Figure 13:
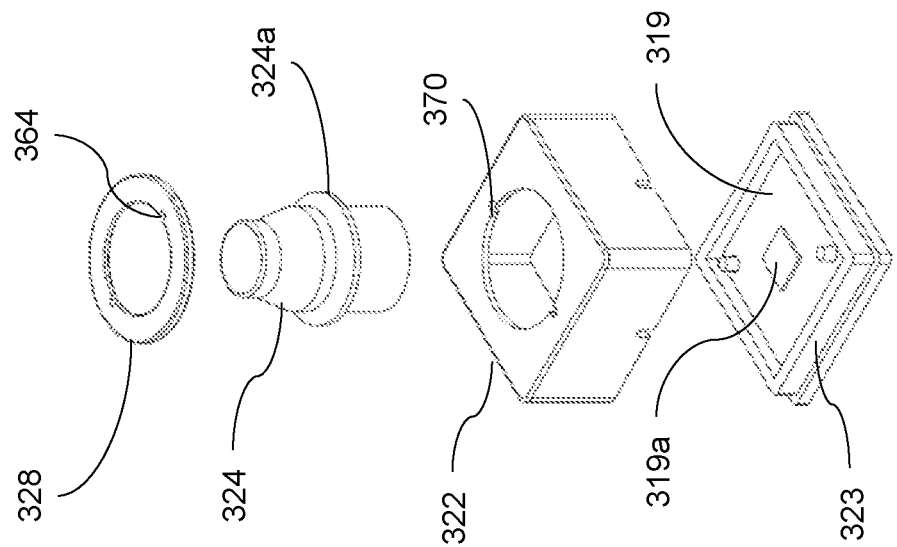
FIG. 13 is an exploded view of the camera assembly of FIG. 12.
Figure 12:
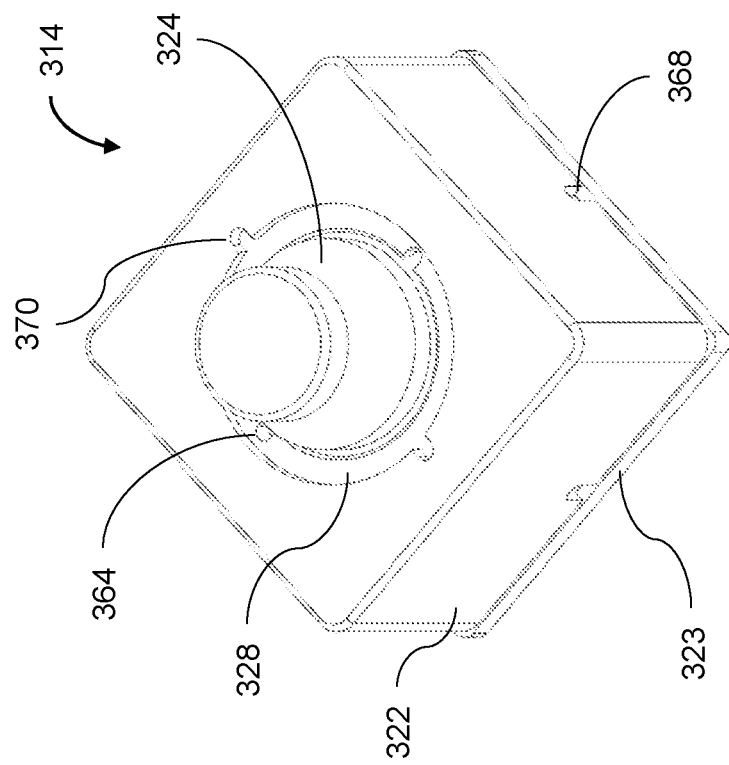
FIG. 12 is a perspective view of the camera assembly with the alignment washer disposed at an inner surface of the front camera housing.
Figure 14:
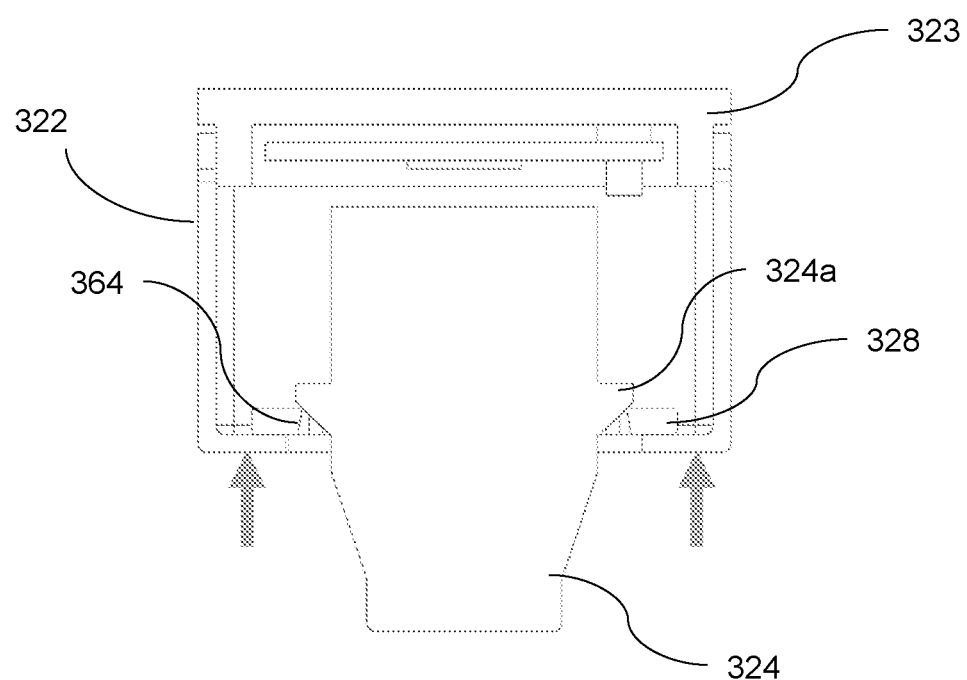
FIG. 14 is a sectional view of the camera assembly of FIG. 12.

With the lens barrel 324 received along the passageway of the front housing 322, an annular alignment ring or washer or member 328 is adjustably disposed about the lens barrel 324 and engages the lens barrel flange 324*a* and a surface of the front housing portion 322. That is, the alignment washer 328 is configured to overlap the lens barrel flange 324*a* at the surface of the front housing 322 to engage both the lens barrel 324 and the housing 322. The alignment washer 328 may be disposed at an exterior surface of the front housing 322, and thus be disposed exterior the front housing 322 when engaging the lens barrel flange 324 (FIGS. 8-11), or the alignment washer 328 may be disposed at an interior surface of the front housing 322, and thus be disposed interior the front housing 322 when engaging the lens barrel flange 324 (FIGS. 12-14).

As shown in FIGS. 10 and 11, the alignment washer 328 may include a tapered or rounded or spherical or otherwise shaped or contoured engagement surface 360 that engages a corresponding tapered or rounded or spherical or otherwise shaped or contoured engagement surface 362 of the lens barrel flange 324*a*. The engagement surface 360 of the alignment washer 328 and the engagement surface 362 of the lens barrel flange 324*a* may cooperate to form a lens ball joint that allows for the lens barrel 324 to be tilted relative to the imager 319*a*, as indicated in FIG. 10. As shown, the X and Y directions may be along a primary plane of the imager 319*a*, and the Z direction may be perpendicular to the plane of the imager 319*a*.

Movement of the rear housing 323 relative to the front housing 322 along the Z axis provides for Z direction adjustment of lens relative to the imager 319*a*. The lens barrel 324 is positioned by grippers relative to the imager 319*a* and engages the alignment washer 328 at the front housing 322. The front housing 322 is floating relative to the rear housing 323 and the alignment washer 328 is floating to allow for movement of the lens barrel 324 during alignment. Movement of the alignment washer 328 along the front housing portion 322 provides adjustability along the X and Y directions (parallel to the plane of the imager 319*a*). Furthermore, the ball joint interface maintains engagement between the lens barrel flange 324*a* and the alignment washer 328 as the lens barrel 324 is tilted (about the X axis and Y axis that are parallel to the imager plane) relative to the imager 319*a* during focus and alignment.

With the imager 319*a* and lens focused and aligned, a series of tack welds may secure the rear housing 323 and front housing 322, and the alignment washer 328 and lens barrel 324 to the housing. For example, the alignment washer 328 may include one or more first tapered through holes 364 (two shown in FIG. 10, but the alignment washer may have two or three or four (or more) such through holes) formed parallel to an axis of the passageway of the front housing 322 at a position of the washer 328 configured to align with the lens barrel flange 324*a*. That is, the first through holes 364 may pass through the alignment washer 328 parallel to the passageway through which the lens barrel 324 is accommodated. Thus, the first through holes 364 allow for tack welding the alignment washer 328 to the lens barrel flange 324*a* to secure the lens barrel 324 relative to the alignment washer 328. Optionally, the first through holes 364 may extend through the alignment washer 328 (i.e., from an outer surface of the washer to an inner surface of the washer) at an oblique angle relative to the axis of the passageway of the front housing 322. The through holes are tapered so that molten metal or solder material may cool and harden within the through holes and thus maintain a secure connection.

The alignment washer 328 may also include one or more second tapered through holes 366 (two shown in FIG. 11, but the alignment washer may have two or three or four (or more) such through holes) formed parallel to an axis of the passageway of the front housing 322 at a position of the washer 328 configured to align with the front housing 322. That is, the second through holes 366 may pass through the alignment washer 328 parallel to the passageway through which the lens barrel 324 is accommodated, and disposed radially outboard of the first through holes 364. Thus, the second through holes 366 allow for tack welding the alignment washer 328 to the front housing 322 to secure the alignment washer 328 to the front housing 322. Optionally, the second through holes 366 may extend through the alignment washer 328 (i.e., from an outer surface of the washer to an inner surface of the washer) at an oblique angle relative to the axis of the passageway of the front housing 322. The through holes are tapered so that molten metal or solder material may cool and harden within the through holes and thus maintain a secure connection.

Furthermore, the front or main housing 322 may include one or more alignment slots 368 (two shown in FIG. 10, but the front housing 322 may have two or three or four (or more) such through holes or slots) formed perpendicular to the axis of the passageway of the front housing 322 at a position along a side wall of the front housing 322 configured to align with the rear housing 323. Thus, the alignment slots 368 allow for tack welding the front housing 322 to the rear housing 323 to secure the front housing 322 relative to the rear housing 323. Optionally, the alignment slots 368 may extend through the front housing 322 (i.e., from an outer surface of the front housing to an inner surface of the front housing) at an oblique angle relative to the axis of the passageway of the front housing 322. The through holes may be cylindrical or tapered.

As shown in FIGS. 12-15, when the alignment washer 328 is configured to engage the lens barrel flange 324a at the inner surface of the front housing 322, the front housing 322 may be supported or biased toward the rear housing 323 (with the rear housing fixed and the lens barrel pointing downward) so that the alignment washer 328 floats along the inner surface of the front housing 322. The one or more first tapered through holes 364 (two shown in FIG. 14, but the alignment washer may have two or three or four (or more) such through holes) are formed parallel to an axis of the passageway of the front housing 322 and at a position of the washer 328 that is configured to align with the lens barrel flange 324a and that is accessible from the outer side of the front housing 322 for tack welding the alignment washer 328 to the lens barrel flange 324a. For example, the first tapered through holes 364 may be accessible from the outer side of the front housing 322 at a peripheral edge portion of the passageway through the front housing and outboard of the lens barrel 324. Thus, the alignment washer 328 is secured to the lens barrel flange 324a via tack welding the alignment washer 328 to the lens barrel flange 324a at or through the first tapered through holes 364.

Figure 15:
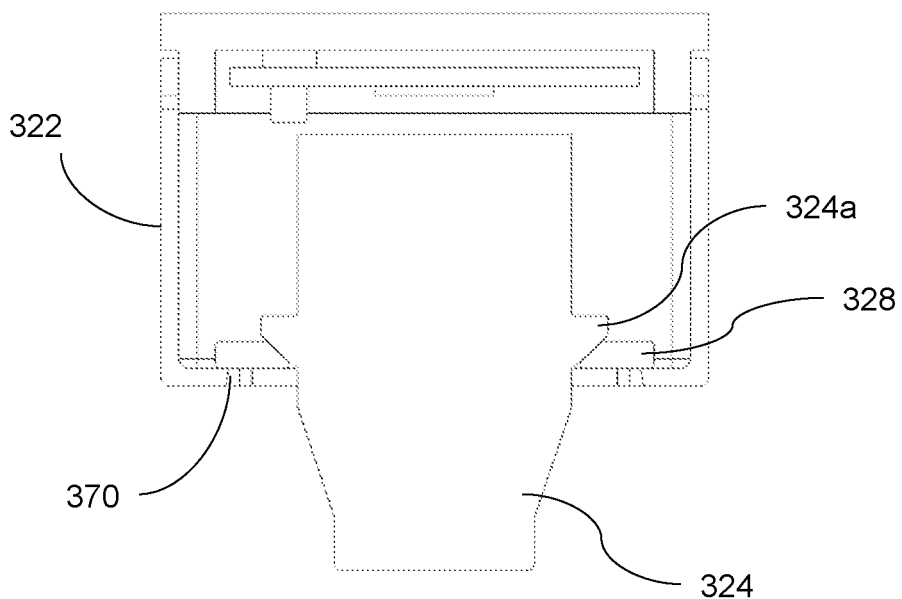
FIG. 15 is another sectional view of the camera assembly.

As shown in FIGS. 12, 13, and 15, the front housing 322 may include one or more slots or through holes 370 (two shown in FIG. 15, but the front housing 322 may have two or three or four (or more) such through holes or slots) that are offset from the first tapered through holes 364 and configured to align with a surface of the alignment washer 328 for tack welding the front housing 322 to the alignment washer 328. The front housing slots 370 are shown formed along a perimeter edge of the passageway, but may be formed at any suitable position through the front surface of the housing 322 to align with the alignment washer 328. In other words, the front housing slots 370 may be formed at a position of the front housing 322 configured to align with a surface of the alignment washer 328 and the front housing 322 may be tack welded to the alignment washer 328 at the front housing slots 370. When the alignment washer 328 is disposed at the front housing 322, the front housing slots 370 are offset or spaced from the tapered through holes 364 so as to not interfere with tack welding of the alignment washer to the lens barrel flange 324a.

Thus, the camera assembly 314 with ball-jointed lens barrel flange 324a and alignment washer 328 allows for better position retention of the lens relative to the imager 319a during tack welding because the connections between the lens barrel and alignment washer and the alignment washer and the front housing are all in contact or engagement with one another. Thus, there is little to no space between the connections that would allow movement of the components during cooling of the tack welds. Additionally, the welds cool along the same direction. Furthermore, the four tack welds between the front housing 322 and rear housing 323 are in opposing directions (e.g., X, −X, Y, and −Y directions), thus any shift due to cooling of the tack welds should cancel itself out. Once the lens is focused and aligned with the lens and the lens barrel and housing portions are at least temporarily secured relative to one another, the components may be permanently fixed relative to one another, such as via laser welding.

In other words, a four-part camera (comprising the lens barrel, front housing portion, rear housing portion, and washer) can minimize or eliminate the gap between welded components. To accommodate the pitch and yaw of the lens, a spherical surface on a washer mates with a spherical surface on a flange of the lens barrel. This flange also provides adjustability along the X-Y plane by moving along the top face of the main housing body. The rear component of the housing attaches to the PCB and provides adjustability in the Z direction. Two tapered holes or slots connect the washer to the main housing, two tapered holes or slots connect the washer to the lens barrel, and four tapered holes or slots connect the main body to the rear housing, for a total of eight spot welds. These tapered holes and slots provide an ideal weld joint. The weld pulls components closer together, rather than further apart. The conical shape allows molten metal of one component to easily flow into the other component, allowing for a smaller spot weld to be utilized. Further, laser hammering may be performed to fine-tune adjustment in specific directions.

Thus, the camera assembly includes surfaces of the lens barrel, camera housing, and alignment member touching or engaged in the Z direction (i.e., parallel to the imager plane), with minimal or no gaps in the X and Y directions (e.g., parallel to the imager plane). The lens barrel, camera housing, and alignment member allows for adjustment of the lens relative to the imager in six degrees of freedom. Further, different weld joint designs may be used to attach the camera housing, the lens barrel, and/or the alignment member, such as using a portion of the housing as filler metal for a plug weld, a tapered through hole, a tapered slot, consumables for solder material, and the like.

The alignment member may be secured to the lens barrel and camera housing in any suitable manner, such as by using laser welding or other attachment techniques, such as by utilizing aspects of the cameras and systems and processes described in U.S. Pat. No. 11,199,758 and/or U.S. Publication Nos. US-2022-0103723; US-2021-0382375 and/or US-2021-0103119, which are all hereby incorporated herein by reference in their entireties.

In the illustrated embodiments, the imager assembly is part of a camera, where the imager assembly may be disposed at a housing portion and the flexible connector may be electrically connected to another circuit board of the camera (such as a processor circuit board having an image processor and other circuitry disposed thereat), such as by utilizing aspects of the windshield-mounted camera assemblies described in U.S. Pat. Nos. 9,896,039; 9,871,971 and/or 9,596,387, which are all hereby incorporated herein by reference in their entireties. Optionally, the imager assembly may be part of an exterior-mounted camera, where a rear housing may be mated with the lens holder after the imager printed circuit board is attached to the lens holder, such as by utilizing aspects of the windshield-mounted camera assemblies described in U.S. Pat. Nos. 10,272,857 and/or 10,264,219, which are hereby incorporated herein by reference in their entireties. The camera assembly includes an electrical connector portion that is configured to electrically connect to a vehicle wire harness when the camera is installed at a vehicle.

Although shown as having a single printed circuit board (having the imager at one side and circuitry and connecting elements (such as a header connector) at the other side), the camera assembly may include an imager printed circuit board and a separate connector printed circuit board, with the circuitry of the two printed circuit boards electrically connected. The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the lens is optically aligned and focused with the imager and the housing portions are joined or bonded. Although shown and described herein as using welding techniques to initially retain and secure the imager PCB and imager relative to the camera housing, the imager PCB and imager may be initially retained and/or secured relative to the alignment element or washer and camera housing via one or more adhesives, such as by utilizing aspects of the cameras and processes described in U.S. Pat. Nos. 10,272,857; 10,264,219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The camera or process or system may include an image processor operable to process image data captured by the camera, such as for determining the degree of focus of the lens and/or for (when the camera is installed at a vehicle) detecting objects or other vehicles or pedestrians or the like in the field of view of the camera. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera, the vehicular camera comprising:
a lens barrel accommodating a lens;
a camera housing comprising a first portion and a second portion;
wherein the first portion of the camera housing includes a passageway therethrough;
an imager printed circuit board (imager PCB) comprising a first side and a second side opposite the first side and separated from the first side by a thickness of the imager PCB, wherein an imager is disposed at the first side of the imager PCB;
wherein the imager PCB is disposed at the camera housing with the imager facing the passageway of the first portion of the camera housing;
an alignment element disposed at the first portion of the camera housing, wherein the alignment element (i) interfaces with a surface of the first portion of the camera housing and an outer surface of the lens barrel and (ii) circumscribes an opening of the passageway;
wherein the alignment element comprises a first through hole configured to align with the surface of the first portion of the camera housing;
wherein, during assembly of the vehicular camera, an inner end of the lens barrel is received through the alignment element and is received at the first portion of the camera housing;
wherein, during assembly of the vehicular camera, and with the inner end of the lens barrel received at the first portion of the camera housing, the lens barrel is adjusted relative to the first portion of the camera housing and relative to the alignment element to initially align the lens relative to the imager;
wherein, with the lens initially aligned relative to the imager, the alignment element is initially attached to the first portion of the camera housing and the lens barrel is initially attached to the alignment element to initially retain the lens relative to the imager;
wherein the alignment element is initially attached to the first portion of the camera housing via welding the alignment element to the first portion of the camera housing, and wherein the alignment element is welded to the first portion of the camera housing at the first through hole formed through the alignment element;
wherein, with the alignment element initially attached to the first portion of the camera housing and the lens barrel initially attached to the alignment element, (i) the first through hole extends through the alignment element in a direction parallel to a longitudinal axis of the passageway of the first portion of the camera housing and (ii) the first through hole is axially offset from the longitudinal axis of the passageway of the first portion of the camera housing;
wherein, during assembly of the vehicular camera, and with the lens initially retained relative to the imager, the lens barrel is adjusted relative to the first portion of the camera housing and the alignment element to further align the lens relative to the imager;
wherein, during assembly of the vehicular camera, and with the alignment element initially attached to the first portion of the camera housing and the lens barrel initially attached to the alignment element, and when the lens barrel is adjusted relative to the first portion of the camera housing to further align the lens relative to the imager, the alignment element (i) is adjustable relative to the first portion of the camera housing and (ii) is adjustable along the outer surface of the lens barrel to accommodate movement of the lens barrel relative to the first portion of the camera housing; and wherein, with the lens further aligned relative to the imager, the alignment element is secured at the first portion of the camera housing and the lens barrel is secured at the alignment element to secure the lens relative to the imager.

2. The vehicular camera of claim 1, wherein, during assembly of the vehicular camera, and with the lens initially retained relative to the imager, the lens barrel is adjusted relative to the first portion of the camera housing using laser hammering.

3. The vehicular camera of claim 1, wherein the alignment element comprises a bezel that (i) interfaces with an outer surface of the first portion of the camera housing and the outer surface of the lens barrel and (ii) circumscribes the opening of the passageway of the first portion of the camera housing.

4. The vehicular camera of claim 3, wherein, after the lens is initially aligned relative to the imager, the bezel is tack welded to the first portion of the camera housing at three or more discrete positions at the outer surface of the first portion of the camera housing to initially attach the bezel to the first portion of the camera housing.

5. The vehicular camera of claim 3, wherein, after the lens is initially aligned relative to the imager, the lens barrel is tack welded to the bezel at three or more discrete positions at the outer surface of the lens barrel to initially attach the lens barrel to the bezel.

6. The vehicular camera of claim 3, wherein the bezel comprises a portion of the lens barrel that engages the outer surface of the first portion of the camera housing and that circumscribes the opening of the passageway of the first portion of the camera housing.

7. The vehicular camera of claim 6, wherein a filler element is disposed between the bezel and the outer surface of the first portion of the camera housing at an aperture formed through the bezel.

8. The vehicular camera of claim 1, wherein the lens barrel is received in the passageway of the first portion of the camera housing.

9. The vehicular camera of claim 8, wherein the alignment element comprises a wedge-shaped element at least partially received in the passageway and disposed between the outer surface of the lens barrel and the first portion of the camera housing at the passageway.

10. The vehicular camera of claim 9, wherein, during assembly of the vehicular camera, and when the lens barrel is adjusted relative to the first portion of the camera housing to further align the lens relative to the imager, the wedge-shaped element moves along the passageway between the outer surface of the lens barrel and the first portion of the camera housing according to movement of the lens barrel relative to the first portion of the camera housing within the passageway.

11. The vehicular camera of claim 1, wherein the alignment element is initially attached to the first portion of the camera housing via tack welding the alignment element to the first portion of the camera housing, and wherein the lens barrel is initially attached to the alignment element via tack welding the lens barrel to the alignment element.

12. The vehicular camera of claim 11, wherein, during assembly of the vehicular camera, and with the lens initially aligned relative to the imager and with the lens initially retained relative to the imager via tack welding, the lens barrel is adjusted relative to the first portion of the camera housing using laser hammering.

13. The vehicular camera of claim 12, wherein the alignment element is secured at the first portion of the camera housing by laser welding the alignment element to the first portion of the camera housing, and wherein the lens barrel is secured at the alignment element by laser welding the lens barrel to the alignment element.

14. The vehicular camera of claim 1, wherein the alignment element is secured at the first portion of the camera housing by laser welding the alignment element to the first portion of the camera housing, and wherein the lens barrel is secured at the alignment element by laser welding the lens barrel to the alignment element.

15. The vehicular camera of claim 1, wherein the alignment element comprises a washer that (i) interfaces with the surface of the first portion of the camera housing and an annular flange of the lens barrel and (ii) circumscribes the opening of the passageway of the first portion of the camera housing.

16. The vehicular camera of claim 15, wherein the washer interfaces with one of (i) an outer surface of the first portion of the camera housing, and (ii) an inner surface of the first portion of the camera housing.

17. The vehicular camera of claim 15, wherein the washer comprises a tapered surface that interfaces with a corresponding tapered surface of the annular flange of the lens barrel.

18. The vehicular camera of claim 15, wherein the first through hole is at a first position of the washer, and wherein the washer comprises (ii) a second through hole at a second position of the washer configured to align with the annular flange of the lens barrel, and wherein the first position is radially outboard of the second position.

19. The vehicular camera of claim 1, wherein, during assembly of the vehicular camera, and as the lens barrel is adjusted relative to the first portion of the camera housing and the alignment element to initially align the lens relative to the imager, the first portion of the camera housing is adjustable relative to the second portion of the camera housing to accommodate movement of the lens barrel relative to the first portion of the camera housing.

20. The vehicular camera of claim 1, wherein, with the lens initially aligned relative to the imager, the first portion of the camera housing is tack welded to the second portion of the camera housing to initially retain the first portion of the camera housing relative to the second portion of the camera housing.

21. A vehicular camera, the vehicular camera comprising:
a lens barrel accommodating a lens;
a camera housing comprising a first portion and a second portion;
wherein the first portion of the camera housing includes a passageway therethrough;
an imager printed circuit board (imager PCB) comprising a first side and a second side opposite the first side and separated from the first side by a thickness of the imager PCB, wherein an imager is disposed at the first side of the imager PCB;
wherein the imager PCB is disposed at the camera housing with the imager facing the passageway of the first portion of the camera housing;
an alignment element disposed at the first portion of the camera housing and circumscribing the passageway;
wherein, during assembly of the vehicular camera, an inner end of the lens barrel is received through the alignment element and is received in the passageway of the first portion of the camera housing;

wherein the alignment element comprises a wedge-shaped element at least partially received in the passageway, and wherein, with the inner end of the lens barrel received through the alignment element and received in the passageway of the first portion of the camera housing, the alignment element is disposed at least partially within the passageway and between an outer surface of the lens barrel and the first portion of the camera housing at the passageway;

wherein, during assembly of the vehicular camera, and with the inner end of the lens barrel received at the first portion of the camera housing, the lens barrel is adjusted relative to the first portion of the camera housing and relative to the alignment element to initially align the lens relative to the imager;

wherein, with the lens initially aligned relative to the imager, the alignment element is initially attached to the first portion of the camera housing and the lens barrel is initially attached to the alignment element to initially retain the lens relative to the imager;

wherein, during assembly of the vehicular camera, and with the lens initially retained relative to the imager, the lens barrel is adjusted relative to the first portion of the camera housing and the alignment element to further align the lens relative to the imager;

wherein, during assembly of the vehicular camera, and with the alignment element initially attached to the first portion of the camera housing and the lens barrel initially attached to the alignment element, and when the lens barrel is adjusted relative to the first portion of the camera housing to further align the lens relative to the imager, the alignment element (i) is adjustable relative to the first portion of the camera housing and (ii) is adjustable along the outer surface of the lens barrel to accommodate movement of the lens barrel relative to the first portion of the camera housing;

wherein, during assembly of the vehicular camera, and with the lens initially retained relative to the imager, the lens barrel is adjusted relative to the first portion of the camera housing using laser hammering; and wherein, with the lens further aligned relative to the imager, the alignment element is secured at the first portion of the camera housing and the lens barrel is secured at the alignment element to secure the lens relative to the imager.

22. The vehicular camera of claim 21, wherein, during assembly of the vehicular camera, and when the lens barrel is adjusted relative to the first portion of the camera housing to further align the lens relative to the imager, the wedge-shaped element moves along the passageway between the outer surface of the lens barrel and the first portion of the camera housing according to movement of the lens barrel relative to the first portion of the camera housing within the passageway.

23. The vehicular camera of claim 21, wherein the alignment element is initially attached to the first portion of the camera housing via tack welding the alignment element to the first portion of the camera housing, and wherein the lens barrel is initially attached to the alignment element via tack welding the lens barrel to the alignment element.

24. The vehicular camera of claim 23, wherein the alignment element is secured at the first portion of the camera housing by laser welding the alignment element to the first portion of the camera housing, and wherein the lens barrel is secured at the alignment element by laser welding the lens barrel to the alignment element.

25. A vehicular camera, the vehicular camera comprising:
a lens barrel accommodating a lens;
a camera housing comprising a first portion and a second portion;
wherein the first portion of the camera housing includes a passageway therethrough;
an imager printed circuit board (imager PCB) comprising a first side and a second side opposite the first side and separated from the first side by a thickness of the imager PCB, wherein an imager is disposed at the first side of the imager PCB;
wherein the imager PCB is disposed at the camera housing with the imager facing the passageway of the first portion of the camera housing;
an alignment element disposed at the first portion of the camera housing and circumscribing the passageway;
wherein, during assembly of the vehicular camera, an inner end of the lens barrel is received through the alignment element and is received at the first portion of the camera housing;
wherein the alignment element comprises a washer that (i) interfaces with a surface of the first portion of the camera housing and an annular flange of the lens barrel and (ii) circumscribes an opening of the passageway of the first portion of the camera housing;
wherein the alignment element comprises a first through hole configured to align with the surface of the first portion of the camera housing;
wherein, during assembly of the vehicular camera, and with the inner end of the lens barrel received at the first portion of the camera housing, the lens barrel is adjusted relative to the first portion of the camera housing and relative to the alignment element to initially align the lens relative to the imager;
wherein, with the lens initially aligned relative to the imager, the alignment element is initially attached to the first portion of the camera housing and the lens barrel is initially attached to the alignment element to initially retain the lens relative to the imager;
wherein the alignment element is initially attached to the first portion of the camera housing via tack welding the alignment element to the first portion of the camera housing, and wherein the lens barrel is initially attached to the alignment element via tack welding the lens barrel to the alignment element;
wherein the alignment element is welded to the first portion of the camera housing at the first through hole formed through the alignment element;
wherein, with the alignment element initially attached to the first portion of the camera housing and the lens barrel initially attached to the alignment element, (i) the first through hole extends through the alignment element in a direction parallel to a longitudinal axis of the passageway of the first portion of the camera housing and (ii) the first through hole is axially offset from the longitudinal axis of the passageway of the first portion of the camera housing;
wherein, during assembly of the vehicular camera, and with the lens initially retained relative to the imager, the lens barrel is adjusted relative to the first portion of the camera housing and the alignment element to further align the lens relative to the imager;
wherein, during assembly of the vehicular camera, and with the alignment element initially attached to the first portion of the camera housing and the lens barrel initially attached to the alignment element, and when the lens barrel is adjusted relative to the first portion of the camera housing to further align the lens relative to the imager, the alignment element (i) is adjustable relative to the first portion of the camera housing and (ii) is adjustable along an outer surface of the lens barrel to accommodate movement of the lens barrel relative to the first portion of the camera housing; and wherein, with the lens further aligned relative to the imager, the alignment element is secured at the first portion of the camera housing and the lens barrel is secured at the alignment element to secure the lens relative to the imager.

26. The vehicular camera of claim 25, wherein, during assembly of the vehicular camera, and with the lens initially retained relative to the imager, the lens barrel is adjusted relative to the first portion of the camera housing using laser hammering.

27. The vehicular camera of claim 25, wherein the alignment element is secured at the first portion of the camera housing by laser welding the alignment element to the first portion of the camera housing, and wherein the lens barrel is secured at the alignment element by laser welding the lens barrel to the alignment element.

28. The vehicular camera of claim 25, wherein the washer interfaces with one of (i) an outer surface of the first portion of the camera housing, and (ii) an inner surface of the first portion of the camera housing.

29. The vehicular camera of claim 25, wherein the washer comprises a tapered surface that interfaces with a corresponding tapered surface of the annular flange of the lens barrel.

30. The vehicular camera of claim 25, wherein the first through hole is at a first position of the washer, and wherein the washer comprises a second through hole at a second position of the washer configured to align with the annular flange of the lens barrel, and wherein the first position is radially outboard of the second position.

* * * * *

UNITED STATES PATENT AND TRADEMARK OFFICE
CERTIFICATE OF CORRECTION

PATENT NO. : 12,422,691 B2
APPLICATION NO. : 18/318251
DATED : September 23, 2025
INVENTOR(S) : Janie R. Harari et al.

Page 1 of 1

It is certified that error appears in the above-identified patent and that said Letters Patent is hereby corrected as shown below:

In the Specification

Column 2
Line 47, "FIG. 12; and" should be --FIG. 12;--

In the Claims

Column 16
Claim 18, Line 32, "comprises (ii) a second" should be --comprises a second--

Signed and Sealed this
Twenty-first Day of October, 2025

John A. Squires
*Director of the United States Patent and Trademark Office*